United States Patent [19]

Nun et al.

[11] Patent Number: 4,555,727

[45] Date of Patent: Nov. 26, 1985

[54] OPTICAL SCANNING APPARATUS

[75] Inventors: Emmanuel B. Nun, Jerusalem; Rafi Izhar, Mazkeret Batya; Avner Karpol, Nes Ziona, all of Israel

[73] Assignee: Optrotech Ltd., Nes Ziona, Israel

[21] Appl. No.: 532,172

[22] Filed: Sep. 14, 1983

[30] Foreign Application Priority Data

Sep. 14, 1982 [IL] Israel .......................... 66788

[51] Int. Cl.[4] .............................................. H04N 7/18
[52] U.S. Cl. ..................................... 358/106; 358/101; 350/96.3; 356/237
[58] Field of Search ................ 358/101, 106, 107, 93; 356/237, 239; 350/96.3, 96.12, 96.1, 96.24, 96.29

[56] References Cited

U.S. PATENT DOCUMENTS

| 3,278,754 | 10/1966 | Wallace | 350/96.24 X |
| 3,489,481 | 1/1970 | Osterberg et al. | 350/96.12 X |
| 3,749,924 | 10/1971 | Vischalis | 350/96.24 X |
| 4,068,920 | 1/1978 | Bass et al. | 350/96.30 X |
| 4,139,262 | 2/1979 | Mahlein et al. | 356/96.30 X |
| 4,253,113 | 2/1981 | Decavel et al. | 358/106 |
| 4,476,489 | 10/1984 | Weltlich et al. | 358/107 |

*Primary Examiner*—Howard W. Britton
*Assistant Examiner*—Victor R. Kostak
*Attorney, Agent, or Firm*—Burgess, Ryan & Wayne

[57] ABSTRACT

Scanning apparatus comprising a base, a light source mounted on the base, a camera mounted on the base and arranged to observe a workpiece surface to be scanned and an optical waveguide arranged in light receiving relationship with the light source for directing light to the workpiece surface, the optical waveguide being operative to provide uniform, homogeneous diffuse illumination of the workpiece surface, thereby to prevent definition of shadows thereon.

5 Claims, 4 Drawing Figures

OPTICAL SCANNING APPARATUS

FIELD OF THE INVENTION

The present invention relates to optical and electro-optical devices generally and more particularly to an improved electro-optical scanning apparatus.

BACKGROUND OF THE INVENTION

Various types of electro-optical scanning apparatus are known and are incorporated in a wide range of apparatus. In general, the scanning apparatus includes a light source which directly illuminates a surface to be scanned and a camera for sensing visible characteristics of the surface. Both the camera and the light source may be mounted on a movable base which may undergo translation in scanning relationship with a surface. Alternatively, the camera may remain stationary and the surface may be translated relative thereto. As a further alternative, both the camera and the scanned surface remain stationary and the scanning is only over the time dimension.

Normally scanning apparatus of the type described hereinabove uses a very high intensity light source in order to obtain an acceptable signal to noise ratio at the camera output. The use of such a high intensity light source involves a number of difficulties: A great amount of heat is generated, while at the same time, the high intensity of the light source requires nearly complete shielding in order to prevent injury to an operator. Thus forced air cooling systems are required to be provided in association with the light source.

Secondly, the high intensity of the illumination tends to produce shadows in the surface being scanned as the result of surface irregularities therein, resulting in incorrect scanning outputs. Thirdly, the great amount of heat generated by the light source may produce distortions in the surface being scanned and may even damage the surface. The above problems are particularly significant when a camera such as a CCD camera is employed, since overcoming them limits operation of the camera and does not enable the entire dynamic range of the camera to be employed. As a result, complex and expensive signal processing circuitry is required at the output of the camera to compensate.

SUMMARY OF THE INVENTION

The present invention seeks to overcome the disadvantages of prior art scanning apparatus as described hereinabove and to provide scanning apparatus which is more cost effective and easier to use than known apparatus of this type.

There is thus provided in accordance with a preferred embodiment of the present invention a scanning apparatus comprising a base, a light source mounted on the base, a camera mounted on the base and arranged to observe a workpiece surface to be scanned and an optical waveguide arranged in light receiving relationship with the light source for directing light to the workpiece surface, the optical waveguide being operative to provide uniform, homogeneous diffuse illumination of the workpiece surface, thereby to prevent definition of shadows thereon.

Further in accordance with a preferred embodiment of the present invention, a selectable wavelength optical shielding apparatus is provided in association with the light source for permitting transmission therethrough of radiation in the non-visible spectra for cooling of the light source and for reflecting radiation in the visible spectrum onto the optical waveguide.

In accordance with an alternative embodiment of the present invention, a filter may be interposed between the light source and the optical waveguide.

In accordance with a preferred embodiment of the present invention, the optical wave guide may comprise a rectangular piece of ordinary glass whose end adjacent the workpiece surface is ground to provide a directionally diffuse output. Further in accordance with a preferred embodiment of the present invention, the width of the waveguide and the separation between the ground end surface thereof and the workpiece surface is selected such that a triangle defined by the side edges of the workpiece and the workpiece surface defines an angle of between 30 and 40 degrees at the vertex touching the workpiece surface. This condition ensures that in the embodiment tested, no shading of the workpiece surface is produced.

Further in accordance with a preferred embodiment of the present invention the camera is a CCD line scan camera.

BRIEF DESCRIPTION OF THE DRAWINGS

The present invention will be more fully understood and appreciated from the following detailed description taken in conjunction with the drawings in which.

DETAILED DESCRIPTION OF THE INVENTION

Figure 1A:
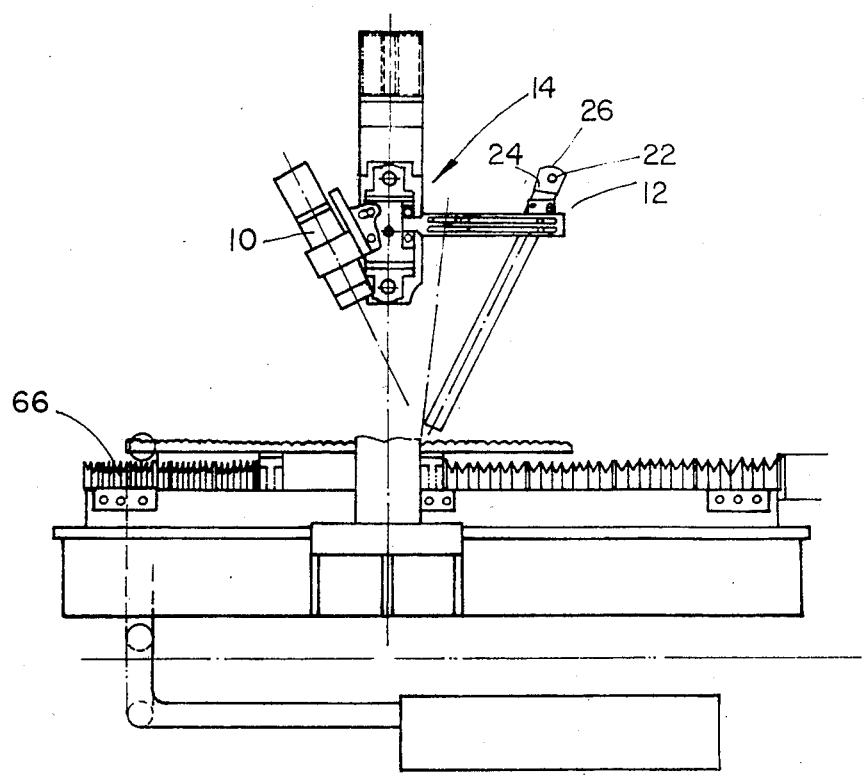
FIGS. 1A and 1B are respective first and second mutually perpendicular side view illustrations of scanning apparatus constructed and operative in accordance with a preferred embodiment of the present invention.
Figure 1B:
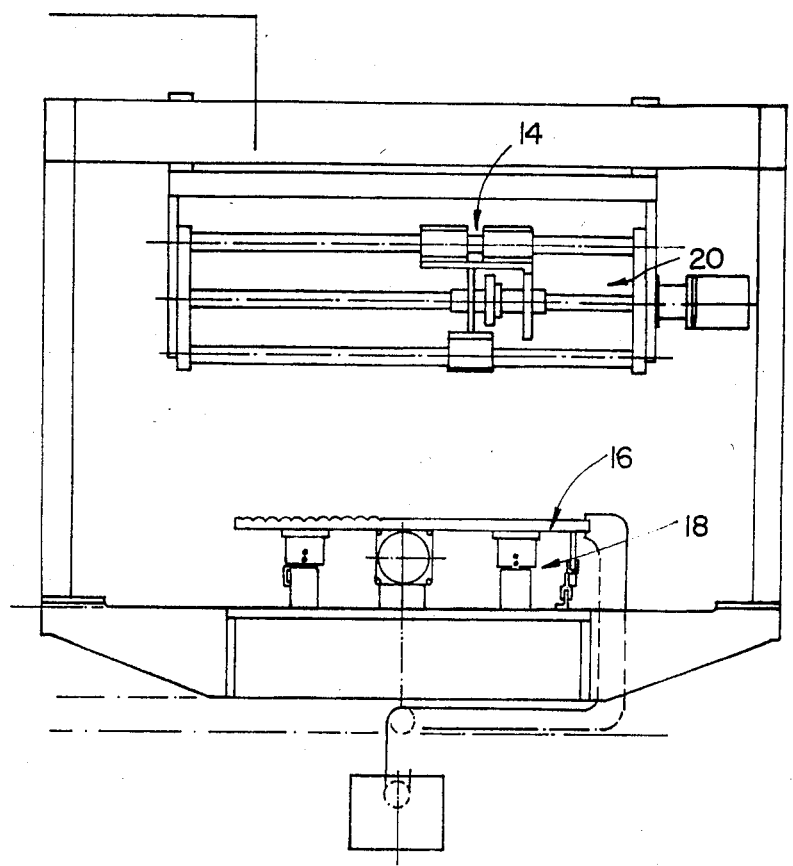

Reference is now made to FIGS. 1A, 1B, 2A and 2B which illustrate a scanning apparatus constructed and operative in accordance with a preferred embodiment of the present invention. FIG. 1 illustrates generally scanning apparatus constructed and operative in accordance with a preferred embodiment of the present invention and comprising a camera 10, preferably a CCD camera such as a model CCD 1200R manufactured by Fairchild of the U.S.A., and an illumination assembly 12 mounted on a mounting assembly 14. A workpiece support 16 is mounted on translation apparatus 18, arranged for axial motion, while mounting assembly 14 is similarly mounted on translation apparatus 20 arranged for motion along an axis perpendicular to the axis of motion of translation apparatus 18. It is noted that FIG. 1B does not show the camera 10 and the illumination assembly 14, but only the mounting assembly 14 therefor.

Figure 2A:
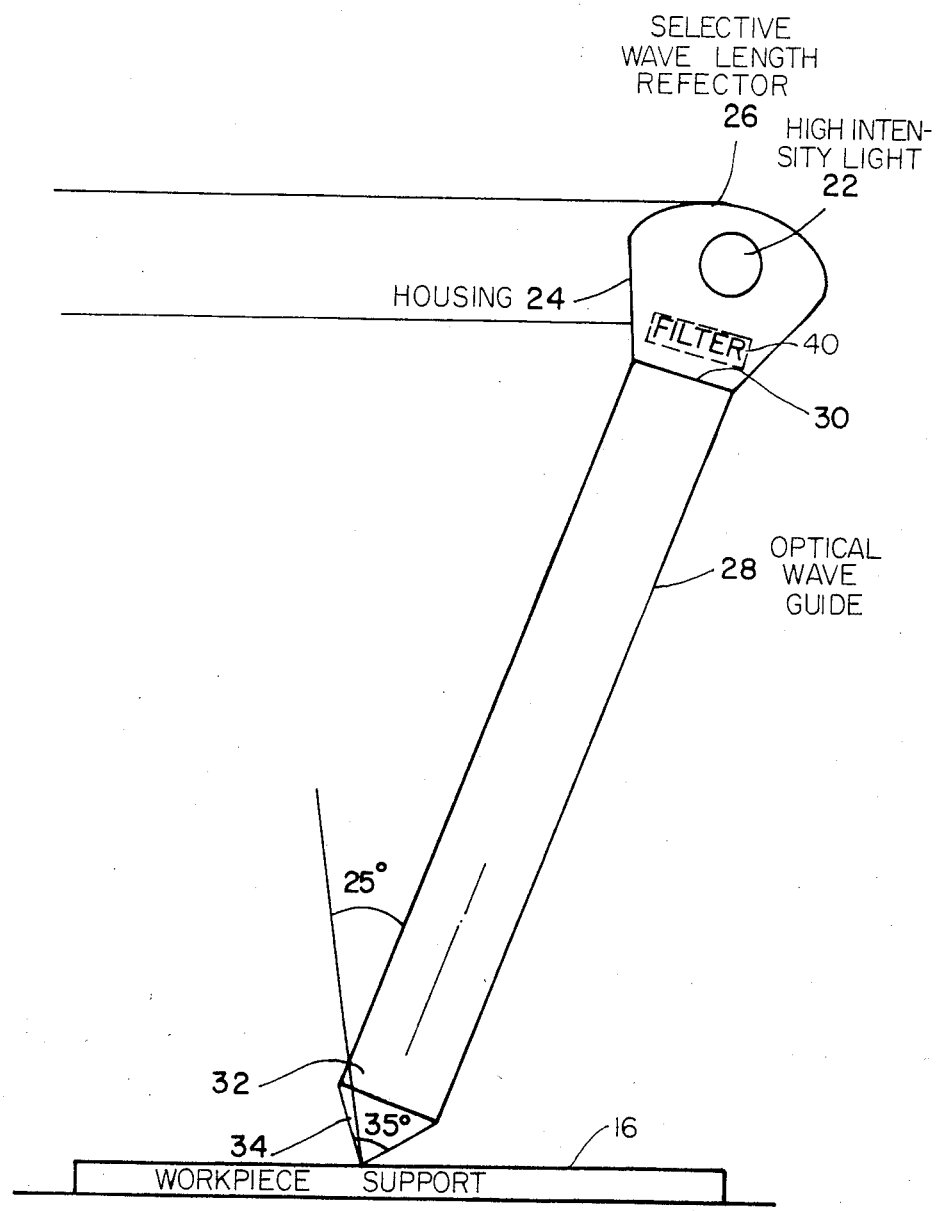
FIGS. 2A and 2B are respective front and side view illustrations of the optical waveguide forming part of the apparatus of FIG. 1.
Figure 2B:
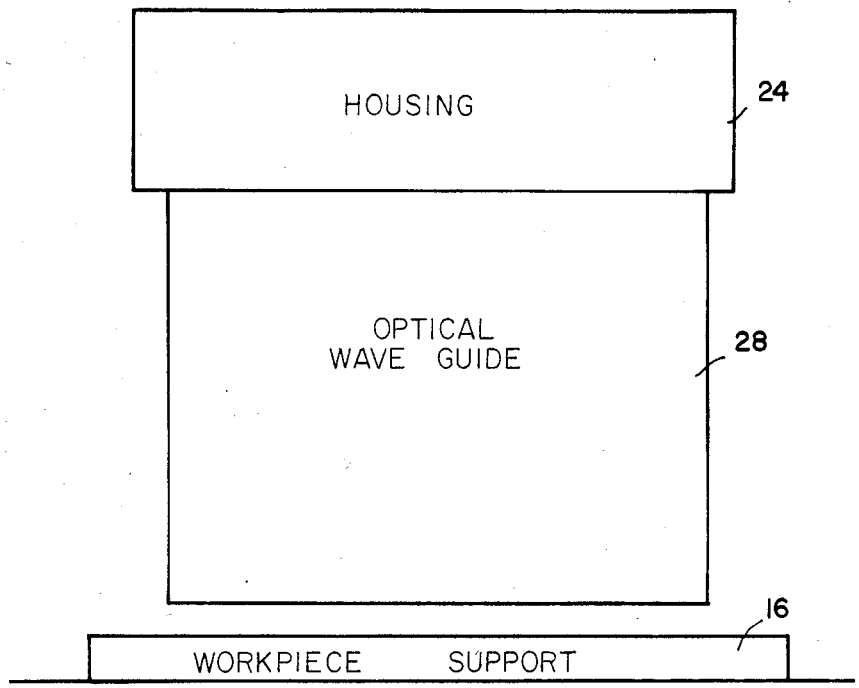

The illumination assembly 12 is illustrated in detail in FIGS. 2A and 2B and is seen to comprise a high intensity light source such as a halogen incandescent lamp 22, which is arranged in a partially open housing 24. Disposed rearwardly of lamp 22 is a selective wavelength reflector 26 of conventional construction comprising coated glass and obtainable from Ophir Optics Ltd. of Jerusalem, Israel. This reflector is effective to allow passage of radiation outside of the visible range therethrough and to reflect light in the visible range.

Arranged in spaced relationship with lamp 22 on the opposite side therefrom reflector 26 is an optical waveguide 28, typically comprising a rectangular slab of ordinary glass or any suitable plastic, such as Perspex. The thickness of the slab is typically 11 mm and its width is equivalent to the width of the particular lamp being used.

The top surface 30 of the waveguide 28 is smooth and is normally spaced about 20 mm from the lamp 22. The bottom surface 32 of the waveguide is normally ground in accordance with a preferred embodiment of the invention, in order to provide a directionally diffuse high intensity light ouptut to the workpiece surface so as to eliminate shadows thereon. Surface 32 is normally spaced from about 10 mm from the workpiece surface and is angled with respect thereto by an angle of typically 25 degrees.

A filter 40 is interposed between the light source 22 and optical waveguide 28 removes infra-red radiation outside of the visible spectrum.

It is a particular feature of the preferred embodiment that an imaginary triangle 34 defined between the two side surfaces of the wave guide and the workpiece surface, as seen in FIG. 2A, defines a vertex angle of between 30 and 40 degrees. This particular arrangement also is important in preventing the definition of shadows on the workpiece surface while not sacrificing light intensity.

It will be appreciated by persons skilled in the art that the construction of the illumination assembly described above has a number of significant advantages. It provides a high degree of concentration of light on a localized area in a directionally diffuse manner so as to eliminate shadows. It obviates the need for expensive and complex ventilation apparatus since it enables outward radiation of the non-visible spectra. It enables the full dynamic range of the CCD camera to be employed, thus obviating the need for expensive and complex signal processing circuitry which would otherwise be required.

It will be appreciated by persons skilled in the art that the present invention is not limited to what has been specifically shown and described hereinabove. Rather the scope of the present invention is defined only by the claims which follow:

We claim:

1. Scanning apparatus, comprising:
   a base;
   a light source mounted on said base;
   a camera mounted on the base and arranged to observe a workpiece surface to be scanned; and
   an optical waveguide arranged in light receiving relationship with said light source for directing light from a light output surface thereof to said workpiece surface, said optical waveguide being operative to provide uniform, homogeneous, diffuse illumination of the workpiece surface, thereby to prevent definition of shadows thereon, said optical waveguide comprising a slab of optically transmissive material formed with a ground surface at the light output surface thereof for diffusing the light output therefrom, said ground surface being disposed adjacent the workpiece.

2. Scanning apparatus according to claim 1 and also comprising means for providing relative movement between said camera and said workpiece surface along at least one axis.

3. Apparatus according to claim 1 and also comprising selectable wavelength optical shielding means associated with said light source for permitting radiation therethrough of radiation in the non-visible spectra for cooling of the light source and for reflecting radiation in the visible spectrum onto the optical waveguide.

4. Apparatus according to claim 1 and also comprising filter means interposed between said light source and said optical waveguide, for removing infra-red radiation outside of the visible spectrum.

5. Apparatus according to claim 1 and wherein said optical waveguide is configured and disposed relative to the workpiece so as to define an angle of between 30 and 40 degrees between imaginary lines connecting the workpiece surface and the two side surfaces of the waveguide.

* * * * *